United States Patent [19]

Abecassis

[11] Patent Number: 5,426,281
[45] Date of Patent: Jun. 20, 1995

[54] TRANSACTION PROTECTION SYSTEM

[76] Inventor: Max Abecassis, 19020 N.E. 20th Ave., Miami, Fla. 33179

[21] Appl. No.: 144,220

[22] Filed: Oct. 29, 1993

Related U.S. Application Data

[63] Continuation of Ser. No. 748,424, Aug. 22, 1991, abandoned.

[51] Int. Cl.⁶ .............................................. G06F 15/30
[52] U.S. Cl. .................................. 235/379; 235/380; 902/24; 902/40
[58] Field of Search .................. 235/379, 380; 902/24, 902/40; 364/401, 406, 408

[56] References Cited

U.S. PATENT DOCUMENTS

| | | |
|---|---|---|
| 32,985 | 6/1989 | Nagata et al. |
| 3,652,795 | 3/1972 | Wolf et al. |
| 4,270,042 | 5/1981 | Case |
| 4,321,672 | 3/1982 | Braun et al. |
| 4,341,951 | 7/1982 | Benton |
| 4,454,414 | 6/1984 | Benton |
| 4,713,761 | 12/1987 | Sharpe et al. |
| 4,750,119 | 6/1988 | Cohen et al. |
| 4,823,264 | 4/1989 | Deming |
| 4,941,090 | 7/1990 | McCarthy |
| 5,010,485 | 4/1991 | Bigari |
| 5,025,372 | 6/1991 | Burton et al. |

Primary Examiner—Harold Pitts

[57] ABSTRACT

A transaction protection system is provided that permits non-related third parties to offer an impartial, readily accessible standardized service that will protect and encompass any moneys that are tendered by an individual or business entity to a transaction in relation to a second business or entity. Delivery of payment will occur upon a future condition being met automatically whereby the system both performs an escrowing function, a payment function and a notifying function automatically. The transaction processing system acts as a temporary depository control in the flow of the moneys from parties in a transaction ensuring that sufficient balances are available for the transaction and assuring that payment is made only upon satisfaction of the conditions set by the parties to the transaction. The system is implemented by means of either an integrated credit/debit system, deposit slips and forms or through conventional checks combined with either credit card or deposit slips. The system may be implemented using site dependent or site independent (portable) point of sales terminals, computers or touch tone telephones. The system further implements electronic accessing means for allowing either of the parties to the transaction to affect the processing of the transaction.

9 Claims, 12 Drawing Sheets

```
        12345267890123456789
             BATCH: 123

DEPOSIT CHARGE

THE SELLER'S NAME
           STREET ADDRESS
           CITY ST  12345
            305-932-0169

CLERK: 1234
```

⌒
                                   611

```
   DATE:05/20/91
   TIME:15:31
   ACCT:1234123412341234
      EXP:0193
 CD TYPE: DPC
 TR TYPE: DEPCHA
 CHECK #:  NONE
 AP CODE:123456
 DEP NO. :1234567801234

AMOUNT:$500.00
 DELIVERY: 07/12/91

X—————————————————
   I AGREE TO PAY ABOVE DEPOSIT
   AMOUNT ACCORDING TO CARD ISSUER
   AGREEMENT

TOP COPY-MERCHANT
   BOTTOM COPY-CUSTOMER
```

FIG. 6

DEPOSIT PROTECTION CORPORATION
DEPOSIT CHARGE

THE SELLER'S NAME
Street Address
City, ST Zip

DEPOSIT #          00000 0 00000 00000
                   0000 05/20/91    11:36 PM

DPC CHARGE        $00.00

ACCOUNT #           1234123412341234
AUTHORIZATION #     00000000000
EXPIRATION DATE     01//93
MERCHANT #          12345678901                 612
CHECK #               NONE

DELIVERY            06/20/91

Cardholder acknowledges the Deposit in the amount shown hereon and agrees to perform the obligations set forth in the Cardholder's agreement with the issuer.

Cardholder Signature

X

IMPORTANT: RETAIN THIS COPY FOR YOUR RECORDS
CUSTOMER COPY

DEPOSIT # 123456789012345

| Description | Quan. | Price | Extension |
|---|---|---|---|
|  |  |  |  |
|  |  |  |  |
|  |  |  |  |

| Date | Contract # | Sub Tot |  |
|---|---|---|---|
|  |  | Misc |  |
| Authorization | Delivery By | Tax |  |
|  |  | Total |  |
| Check # | DEPOSIT |  |  |

CUSTOMER COPY

Purchaser sign here

X————————————————————
Cardholder acknowledges the Deposit in the amount shown hereon and agrees to perform the obligations set forth in the Cardholder's agreement with the Issuer.

IMPORTANT: RETAIN THIS COPY FOR YOUR RECORDS

FIG. 8

DEPOSIT PROTECTION CORPORATION

DEPOSIT #123456789012345

Seller's Name:

DPC CARD# ☐☐☐☐☐☐☐☐☐☐☐☐☐☐

Buyer's Name:

DPC CARD# ☐☐☐☐☐☐☐☐☐☐☐☐☐☐

Contract #

Delivery By:

Total Price:

Deposit:

614

Deposit Check # _____ for the amount of the Deposit is attached, or charge my DPC account.

_____
Charge Authorization Signature

Seller will deliver as indicated above. Seller and Buyer agree to the terms of the Deposit Protection Corporation Deposit Agreement.

Seller's Signature_____

Buyer's Signature_____

Important retain this copy for your records.
BUYER'S COPY

FIG. 9

DEPOSIT PROTECTION CORPORATION

DEPOSIT   #12345678901234

☐ Mr.  Seller's Name:
☐ Ms

Title:

Firm:

Address:

City, State, Zip

Area Code Phone: | Soc sec #. If firm Fed ID #

DPC CARD# ☐☐☐☐☐☐☐☐☐☐☐☐☐   619

☐ Mr.  Buyer's Name:
☐ Ms.

Title:

Firm:

Address:

City, State, Zip

Area Code Phone: | Soc sec #. If firm Fed ID #

DPC CARD# ☐☐☐☐☐☐☐☐☐☐☐☐☐

Contract #

Delivery By:

Total Price:

Deposit:

Deposit Check # _ _ _ _ _ _ _ for the amount of the Deposit is attached, or charge my DPC account.

_____
Charge Authorization Signature

Seller will deliver as indicated above. Seller and Buyer agree to the terms of the Deposit Protection Corporation Deposit Agreement.

Seller's Signature_____

Buyer's Signature_____

Important retain this copy for your records.
BUYER'S COPY

TRANSACTION PROTECTION SYSTEM

This application is a continuation of application Ser. No. 07/748,424 filed Aug. 22, 1991, now abandoned.

BACKGROUND OF THE INVENTION

1. Field of the Invention

The invention relates to a method and apparatus that conducts computer-based transactions through a readily accessible, easily implemented, inexpensive and standardized protection system which provides universal application to parties to any type of transaction with equitable control over the transaction payment.

BACKGROUND OF THE PRIOR ART

Consumer transactions have long been more favorable to the seller than to the consumer. When cash transactions were prevalent, the consumer was at a distinct disadvantage unless he/she knew, in advance, that the purchased goods conformed to that purchaser's need and also faithfully performed whatever the consumer was promised. In the event that the purchaser's needs were not met, for whatever reason, then a purchaser's only recourse, absent a seller's agreement to reimburse the purchaser or exchange the purchased item, was to go to court. This problem is magnified when cash was advanced prior to delivery of the purchased goods.

With the advent of credit cards, consumers began to exercise more control over the transaction, since the credit card issuer could, upon notice from the purchaser, refuse payment to the seller until the purchaser was satisfied. However, in such systems, transactions were still more favorable to one side of the transaction, since payment would occur automatically unless the consumer objected. Most current computer-based credit card systems remain one-sided leaving the purchaser with relatively little control.

For example, the arrangement disclosed in the patent to Nagata et al., U.S. Pat. No. Re 32,985, relates to a credit transaction system which enables purchasers having cards to purchase goods up to their credit limit. The credit data is compared to data from a merchant credit card which contains the necessary merchant transaction information. Credit is obtained through a credit company computer which compares a purchaser's credit limit with the amount to be purchased from the merchant's store. If the purchase amount is less than or equal to the credit limit recorded on the card, then a transaction occurs and the amount is immediately transferred to the merchant. Nagata et al. thereby do not conduct transactions. Additionally, payments to the merchants are neither delayed nor based on conditions favorable to the buyer.

Thus current credit card systems, while readily accessible, provide only indirect unspecified protection for a limited number of lower dollar deposit transactions. Such protection is not explicitly guaranteed by the card issuer.

Other transaction systems, not relying on the above-discussed conventional credit card features, also do not resolve the need for purchasers to have equitable protection over purchases. For example, in the patent to Case, U.S. Pat. No. 4,270,042, an electronic funds transfer system is described which is designed exclusively for use with letter of credit transactions The system employs a sorter which feeds out drafts to a transmitter for automatic transmission of data to a clearing house. The clearing house, then issues a debit ticket which effectuates an automatic machine clearance of the transaction through a letter of credit account. Case, however, also fails to disclose a system which delays the transfer of funds based upon conditions favorable to the purchaser.

A further disadvantage of prior art systems is their failure to combine a consumer transaction system with a deposit/based capability in order to provide for transaction payments where deposits are used for payment, and where those deposits are effectively controlled by the purchaser. In fact, where systems have included automatic deposit transfers controlled by third parties, those transfers have not entailed increased control for the purchaser.

For example, the patent to Cohen et al., U.S. Pat. No. 4,750,119, relates to a computer-based purchasing system for purchasers, a plurality of vendors and a future benefits guarantor. The purchaser communicates his purchase to the purchasing center and the order is loaded into a purchasing system program. Funds are then sent to the purchasing center which, after verifying the order and the receipt of the funds, sends the funds and an instruction to pay to an escrow agent. The escrow agent, in turn, pays the vendor the wholesale price for the goods. In addition, the escrow agent pays an insurance company an annual annuity policy premium based on the difference between the retail price and wholesale price. At the end of each accounting period, the system then generates a report for the purchaser showing his/her total individual purchases and an estimated rebate due on the annuity policy purchased. Cohen et al., however, fail to show a deposit escrow system where the purchase funds are delayed from being provided to the seller until certain conditions are met.

It is thus apparent that existing transaction arrangements whether cash based, credit card based or grounded on some derivative transaction arrangement, as exemplified above, fail to provide for transactions that retain even a semblance of control by the purchasing parties in the transaction.

In addition, of the variety of escrow services available, none provide a universal service that is all encompassing with regard to transaction type, readily accessible, or easily implemented as part of usual business transactions. Further conventional escrow services usually suffer from a preestablished one sided relationship to one of the parties, usually the seller. Still further, escrow procedures lack the degree of automation that would permit the automatic disbursement of the deposit based on preestablished conditions (i.e. the passing of the delivery-by-date without the buyer accessing the deposit record and preventing its payment).

It is also apparent that there exists a need in the art for a computer-based transaction system in which the exchange of payment relies upon a non-related third party secured guaranteed account that would manage the appropriate release of funds effectively eliminating the risk of business failure whether by the bank, the merchant, or the escrow agency and yet which retains the needed responsiveness to the paying party.

There also is a need in the art for a transaction/payment system which is easy to use and is economical to implement for any size dollar transactions.

SUMMARY OF THE INVENTION

In view of the foregoing shortcomings of the prior art, it is evident that there exists a need for a method and apparatus that provides a Transaction Protection System ("System") that permits a non-related third party to offer an impartial, readily accessible, easily implemented, inexpensive and standardized service that will uniformly and universally protect and encompass any monies (deposit) that are tendered by an individual or business entity (i.e. buyer) to a second individual or business entity (i.e. seller) for the delivery at a future time of goods, services, and or performance by either party to the other. Further, the system provides the buyer and the seller with appropriate equitable electronic access to and control of the payment. It is therefore a primary object of this invention to provide for a computer-based transaction system where payments for transactions are provided through an escrow-based deposit system that allows purchasers to control the release of the deposit.

It is also an object of the invention to provide a deposit-based transaction system based on credit cards possessed by either by one or both parties to the transaction in order that payments are accomplished automatically. This payment cycle opportunity is not available where a deposit is charged for delivery of merchandise that would occur past the payment cycle. No current credit card system has institutionalized a delay of payment to the seller until delivery has occurred.

It is another object of the invention to provide a system of deposit slips which can be used in conjunction with the escrow/deposit account to accomplish depositing and debiting of the escrow/deposit account.

It is yet another object of the invention to provide for a credit/payment service where initial payment of the deposit is either through credit or by check.

It is also an object of the invention to provide for a transaction system where credit/debit services can be directly or indirectly associated with the system along with a banking account and also with a brokerage account.

It is still an object of the invention to provide for a card-based transaction system where transaction authorization verifications are accomplished through a process and apparatus that is integrated with point of sales equipment and processes or through keypad phone devices which include an entry to indicate date of delivery or other conditions upon which payment is released.

It is yet a further object of the invention to provide a system based on the delivery-by-date where payment is automatically delayed for a predetermined time period in order that one party of the transaction has sufficient time to accept delivery even if physical delivery was made at the time of initiating the transaction.

It is yet a further object of the invention to provide a charge/debit transaction system where electronic transaction processing devices are provided at the transaction site and are independent and/or portable. The transaction capability includes portable computer/-modems, telephones, portable POS terminals, and other such devices comprising a facility for computer-based communications and processing.

Briefly, these and other objects of the invention are accomplished in its apparatus aspects by means of a computer-based transaction system where parties deposit funds in an escrow that is under the control of an unrelated third party to which the depositing party has effective access; at the time of a purchase transaction, the other party (i.e. seller) elicits information from the system to determine that the purchaser has a valid account, and then verifies that the account has sufficient money to cover the purchase. The conditions upon which the deposit will be released are set. The condition entry will also include a time component, i.e. delivery-by-date, that will define the date of the deposit release, i.e. delivery to purchaser.

In its method aspects, the present invention involves a system where transaction details are first entered by the seller and conditions are then set as a result of the agreements reached between seller and buyer relating to the release of that deposit. The seller can then verify the card or depositor number and verify the deposit amount. Verified receipts and/or slips are then provided. Once the transaction has occurred, and the time for delivery has arrived, the purchaser then controls the status of the deposit in escrow by either releasing payment to the seller, placing the deposit on hold, revising the delivery date, or refusing to complete the transaction.

Also provided is a feature where after a predetermined number of days following the delivery-by-date, payment will be automatically made to the seller unless the buyer has acted in the intervening time to prevent same.

With these and other features, advantages and objects of this invention, the manner of attaining the invention is apparent by reference to the following detailed description of the invention taken in conjunction with the accompanying drawings and appended claims.

BRIEF DESCRIPTION OF THE DRAWINGS

Figure 11:
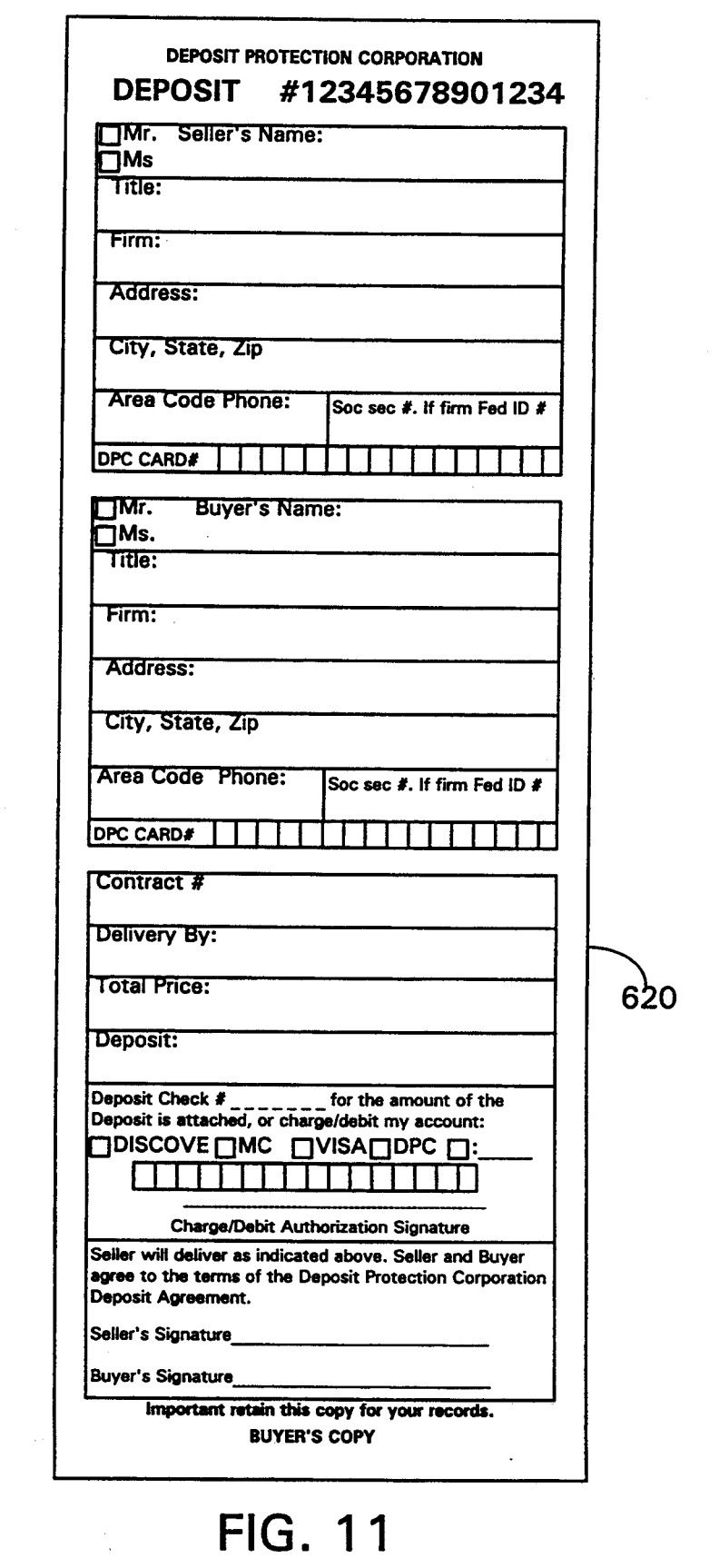

FIGS. 6–12 respectively illustrate examples of the deposit slips employed in the system illustrated in FIGS. 1A–1B.

DETAILED DESCRIPTION OF THE PREFERRED EMBODIMENTS

Figure 1A:
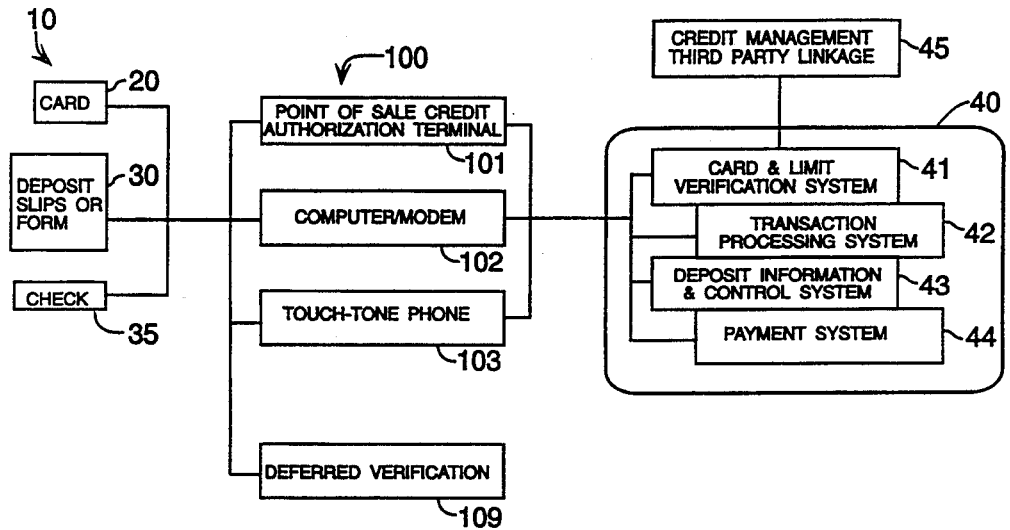
FIGS. 1A and 1B are schematic diagrams representing hardware and process overviews of the transaction protection system according to the present invention.
Figure 1B:
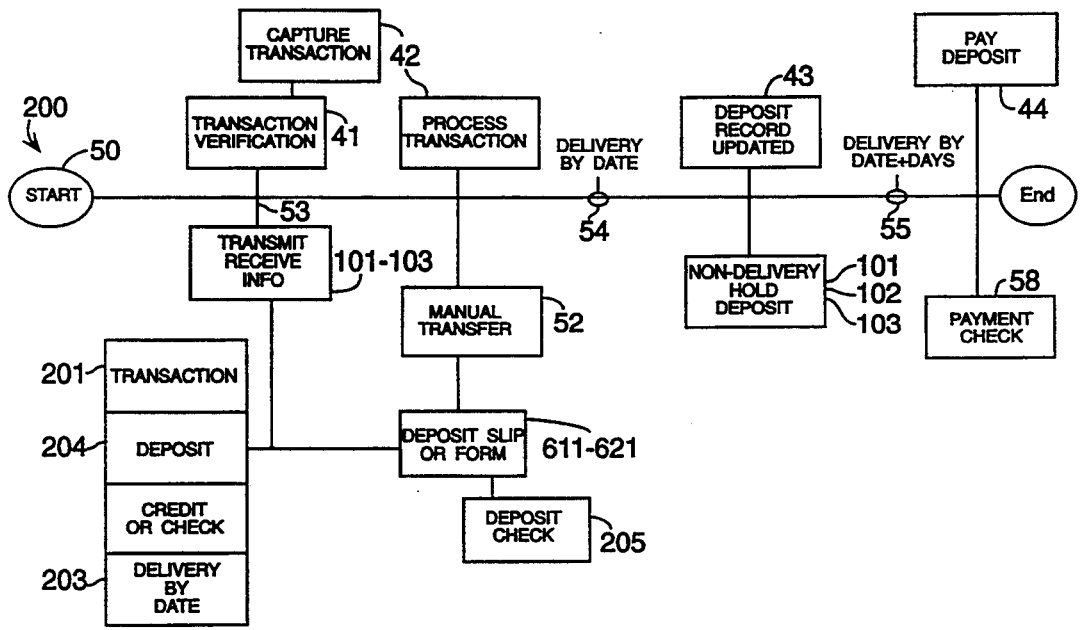

Referring now in detail to the drawings wherein like parts are designated by like reference numerals, throughout, there is illustrated in FIG. 1A, a block diagram of the hardware components forming the financial transaction system of the present invention. FIG. 1B illustrates the overall deposit transaction sequence 20 for operating the hardware shown in FIG. 1A.

Referring particularly to FIG. 1A, the hardware arrangement of the system relies on a party to the transaction, such as a purchaser, to employ various means for completing a transaction. Those means include a credit card 20, deposit slips or forms 30 or a check 35.

The credit/debit card 20 is of a conventional construction, but contains information pertaining to the card holder's deposit account However, the credit card also can contain other information including a card holder's credit balance, as in a conventional credit based credit card system, a bank balance, as in a conventional ATM bank card, a brokerage account report or balance and card holder identification information for use with electronic identification systems.

The purpose of the card 30 is to primarily elicit point of sale instructions and routines specific to the deposit protection system 10 for each customer. In other words, the use of the card enhances the ease in which transactions are accomplished, are verified, and are safeguarded against payment before a delivery has been accepted or other agreed upon conditions pertinent to the transaction are satisfied. Sellers also have their own cards 30 for identification and to gain electronic access to the deposit system for a variety of services. The system envisions no difference in the cards issued to sellers and issued to buyers. The same card may be used in one transaction to sell and on another transaction to buy. The system software provides access depending on the accessing party's transaction identity.

In addition or alternative to the cards, one of a plurality of deposit slips and forms 30 also are provided. Information and details relating to the deposit forms and slips 30 are described in further detail below and with further reference to FIGS. 6-10. Intermediate between the cards, slips and checks are verification communications equipment 100 that are provided either on a variety of site dependent and/or portable hardware devices. The equipment includes a point of sales credit authorization terminal 101, a personal computer/modem station 102 and/or a touch tone phone 103. Any combination of devices can be used.

The point of sales (POS) terminal 101 can be of a conventional design comprising a key operated device that includes a display that indicates credit approval/-disapproval or other pertinent information. The POS terminal 101 is employed only in the event that the card-based implementation of the present invention is utilized and the POS terminal is not able to provide a card number to either party not having been provided a card.

Another input/output element in the system is the computer/modem 102 connected to a monitor and keyboard. The modem 102 also is used to provide input and receive information from the deposit protection center 40. The modem can also be combined with the POS terminal 101 in order that the cards 20, the deposit slips 30 and the checks 35 can all be received as input material. The touch tone phone 103 also can be used either in a stand-alone capacity or in combination with either the computer 102, the POS 101 or a combination thereof. Phone communications to the deposit center 40 can include an computer-based deposit verification recording based upon approved personal identification numbers.

The deferred verification means 109 represents non-computer-based verification communications with the center 40. The purpose of the means 109 are described in FIG. 2 relating to the manual verification operations for the system.

A third portion of the hardware system comprises a deposit protection service center 40 ("the center 40"). In the preferred embodiment, the center 40 is represented as comprising four subsystems: a deposit protection card and limit verification system 41, a deposit transaction processing system 42, a deposit information and control system 43 and a payment system 44. However, other arrangements of the above subsystems are contemplated based upon the particular transaction application. Details of systems 41-44 are described further below.

The overall function of the deposit protection center 40 is to process inputs provided from the communications equipment 100, verify credit-related information on that equipment, such as a user PIN number, determine the purchaser's deposit limit, debit the deposit account and then process and send payment once there is a determination that the transaction has been successfully completed (i.e. by successful delivery of goods to purchaser).

The deposit center can be implemented by one or several computers or other suitable logic devices that are connected to modems to the communications equipment 100 and that include substantial memory capacity. The computer also connects to an escrow source that is adapted to automatically credit and debit designated accounts based upon inputs to the center 40. As previously mentioned, the computer(s) forming center 40 also may interface with electronic credit card systems, such as illustrated in Nagata et al., U.S. Patent No. Re 32,985 which is incorporated herein by reference through the credit management third party linkage 45. In addition, or alternatively, the linkage 45 can integrate center 40 with conventional electronic banking systems, such as that disclosed in Case, U.S. Pat. No. 4,270,042, the disclosure of which also is incorporated herein by reference. Details relating to the operation of center 40 as well as the other hardware elements is provided below in FIGS. 2-5.

Referring now to FIG. 1B, a time sequence detailed flow diagram showing the deposit transaction sequence over the course of an entire transaction is illustrated. To conduct deposit transactions, the present invention takes advantage of the fact that most merchant locations include a point of sales credit authorization terminal 101. In addition to the processing of the credit/debit transactions, most POS terminals 101 can easily be configured to permit the computer-based processing of deposit transactions. It is envisioned that the system can be transparently integrated with the POS through software modifications requiring only those additional key strokes to enter the delivery conditions. One relatively easy way to accomplish hardware reconfiguration is by designating (either by a store-installed switch or by manual key operation) an alternate phone number that the POS can be connected to for deposit transactions. Of course, dedicated POS terminals also are contemplated.

Since most deposit transactions may also be initiated at a site other than the seller's location, a personal portable computer with communications and printing capabilities 102, and/or a touch tone phone 103, will provide the same functions as a POS device while also providing the user with the flexibility of portable access to the center's 40 communication and processing resources. The details of the transaction are as follows.

Figure 3:
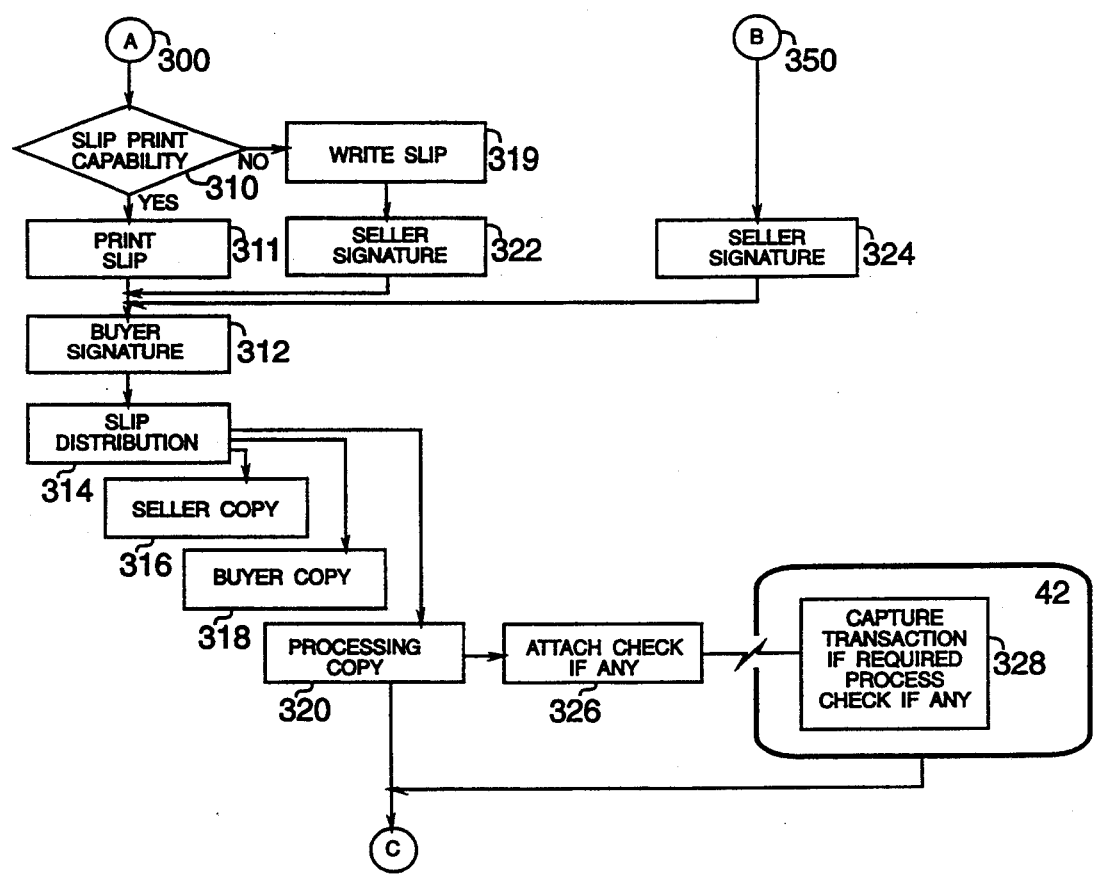
FIG. 3 is a flow chart of the transaction slip completion process of the transaction protection system shown in FIG. 1B.

At step 50, the equipment shown in FIG. 1A is initialized using conventional booting software and/or, firmware. At step 201, the details of the transaction, which will be described in further detail with reference to FIG. 3, are provided. Systems capable of processing a deposit transaction, for example, will share common modifications specific to the deposit transaction. The deposit transaction of this invention requires the entry of a "delivery-by-date" condition 203. It is contemplated that other pertinent conditions for transactions can also be identified at step 203.

As will be described with reference to FIG. 2, the system software will then check whether the deposit conditions fall within certain parameters. The deposit payment entry routine 204 will provide equally for the payment of the deposit by charge/debit or by check 205. The POS then reads the deposit card identification information. In the absence of a POS device, the card number on card 20 is keyed in by equipment 102–103 as previously described. If either the seller and/or the buyer do not have a card number assigned to them, the system makes available to the seller/buyer, a card number to enable those individuals to proceed with a fully computer-based transaction. In the absence of either party having or obtaining a card number, the transaction can continue by means of appropriate manual deposit slips 619–621 and manual entry routines 52.

Details of the transaction are then transmitted at 53 to the deposit protection center 40 where the protection card verification and limit verification system 41 is activated to validate the transaction. As a consequence of a successful verification, an approval number is provided. If the transaction is a deposit, a unique deposit account number is assigned. The transaction information is also retained for later processing, if a condition, such as delivery-by-date 203, is also indicated. The center will then integrate the credit/debit, the check, and the customer approval into a communication. The approval and deposit numbers are then transmitted back to the communications equipment 101–103.

In the absence of devices 101–103, or even if such equipment exists and linkage to the computer-based transaction processing capabilities of the servicing center is unsuccessful, one of a number of manual deposit slips 613–621 can be utilized. The manual deposit slip system includes places where the purchaser can identify conditions for payment of the deposit, such as delivery-by-date 203. Furthermore, the deposit may still be charged or debited subject to later confirmation by the center. If a deposit slip is to be completed manually, it will require both the seller's and buyer's signatures.

Once the transaction is complete, then the system will set the condition, such as delivery-by-date 54. The deposit record is then updated by the deposit information control system 43 and the condition is communicated to the devices 101, 102, 103.

The next stage of the process occurs at step 55 where the pre-condition 203 is met (or not met). Under a fully computer-based implementation, no action on the part of either party to the transaction is required and payment 58 is issued a predetermined number of days following the delivery-by-date unless the buyer has acted to prevent same. Alternatively, the confirmation of the buyer's acceptance of delivery may be required before the deposit is paid to the seller by the payment system 44.

Figure 2:
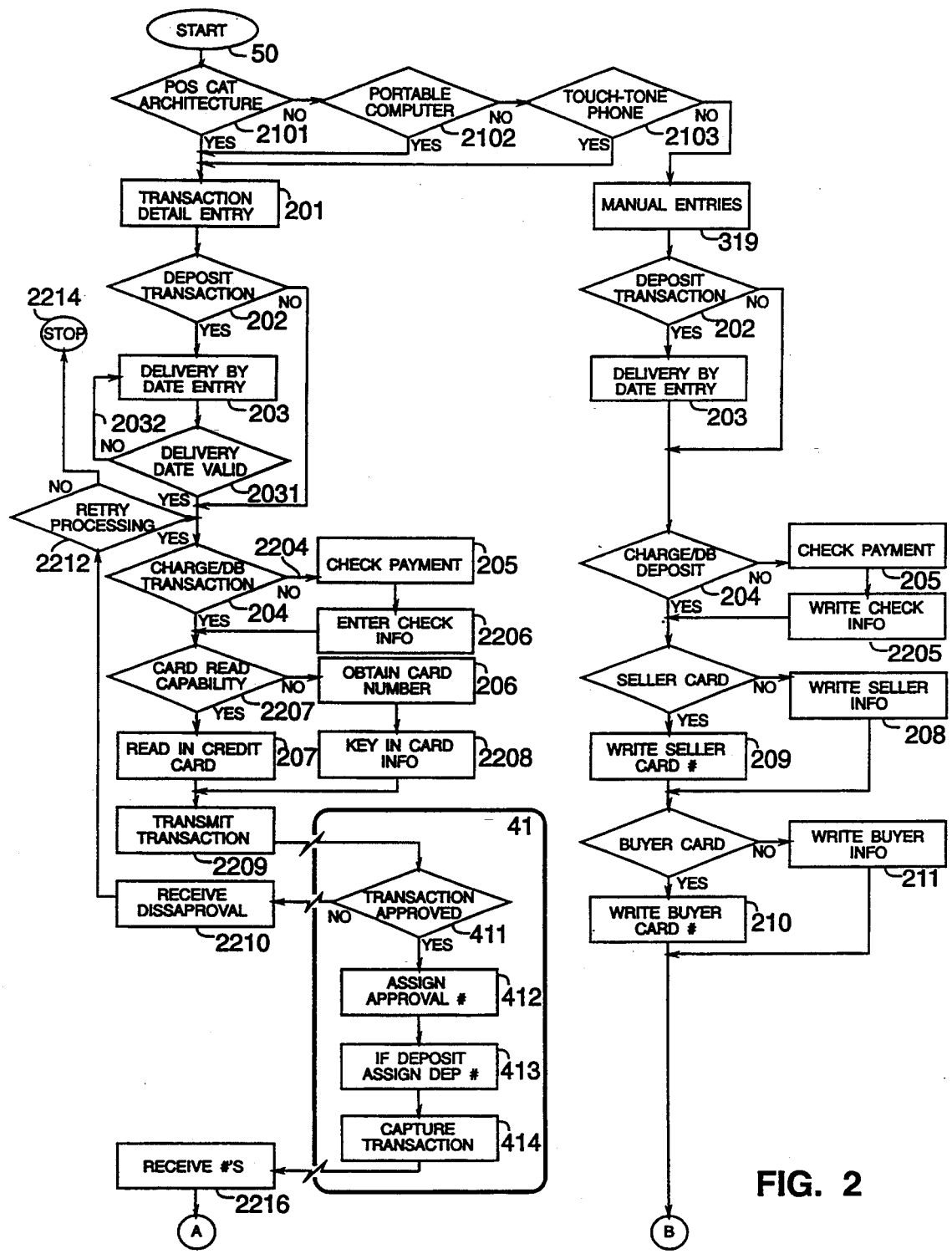
FIG. 2 is a flow chart of the transaction entry process of the transaction protection system according to FIG. 1B.

Referring now to FIG. 2, further details of the deposit transaction process are generally described. As noted in FIG. 1B, the transaction equipment is first initialized at step 50. The appropriate system's communication architecture is engaged by the communication device for input/output being utilized by the user. If the device is either a POS 2101 or a portable computer 2102 or a touch tone phone 2103, then the computer-based processing branch is chosen at step 2104. While the general steps are similar regardless of the specific device utilized, device sensitive modifications are planned, i.e. the system 41 will respond with audio instructions to a touch tone telephone access signals. In this branch of the flow chart, the transaction details are entered into the POS, computer or telephone at step 201.

The system then queries whether the user wishes to establish a deposit at step 202. If the transaction is not a deposit, then the routine tests for a charge/debit or check transaction. Subsequent processing is similar to that found in the art for types of transactions. The present invention, however, provides a unique capability of processing those transactions through a portable computer and/or a touch tone phone, or similar remote access devices and also provides access to the system to prevent the automatic transaction payment.

If the deposit set condition exists, then at step 203, the "delivery-by-date" condition or any other condition suitable to the successful completion of the transaction is identified by the buyer/seller. The delivery date is then tested for validity at step 2031. If the user-entered date of delivery precedes the current date, or if the delivery date exceeds pre-set system tolerances (e.g. longer than 20 years), then a flag is set, and the user is informed of the invalid date entry at step 2032. Entry of a date 203 is then repeated until validity is indicated.

As previously noted, date of delivery need not be the only condition set at step 203 or tested at steps 2031, 2032. For example, a user can specify seller performance as a condition, or define performance parameters that have to be met first before purchaser acceptance exists and payment of the escrowed deposit is tendered. The present invention anticipates that any preconditions for a third party transaction can be programmed at step 203 in order to condition later payment. Unlike the delivery-by-date, some preconditions will disable the automatic payment features of the system and require the active participation of the buyer to affect payment of the deposit.

At step 204, the system queries the user whether he/she wants to charge/debit the transaction. If the answer is "no" 2204, then the system assumes that payment must be by check 206. The user then enters the check number at step 2206.

If the user indicates that a card reading capability exists at step 2207, then the card is automatically read at 207 by the POS 101. Otherwise, the system user obtains the card number at step 206 and types the card number 2208 into either the portable computer 102 or the touch tone telephone 103. The card or check information is then transmitted at step 2209 to the card verification and limitation processor 41 of the deposit center 40.

The transmitted information is then tested at step 411 for approval. The approval transaction 411 entails first checking whether or not the user has a valid identification password. If the identification is valid, then the system checks to see if the transaction involves a deposit to an existing escrowed deposit, or involves a credit through a credit card, or involves a payment command from the deposit card 30. If a debit is to be made, then the system verifies whether or not there is a sufficient balance in the depositor's deposit account to cover the cost of the transaction. If either the identification number or the client account numbers are incorrect, and/or the client balance is too low, then the system communicates an appropriate disapproval message 2210 back to the user. The user is then asked to retry processing at step 2212, whereby the system initiates the charge/debit operation over again at step 204. Alternatively, the user may terminate the entire transaction at step 2214.

If approval is achieved, then the card verification and limit verification system 41 assigns an approval number for a debit transaction 412, and a deposit number for each deposit transaction 413. The transaction information is then stored at step 414 in an appropriate memory contained in the computer system of center 40. Retention of the transaction may be optional.

The manual operations shown in FIG. 2 will now be described.

If it is indicated that neither the POS 101, nor the portable computer 102 nor the touch tone phone 103 is available, then the user can manually enter information through the use of one of the appropriate deposit slips (shown in FIGS. 8–12). For a deposit transaction, the user can write the delivery date by entering preconditions on the deposit form as will be described in further detail below. If the transaction does not involve a deposit, however, the user can use the charge/debit deposit slips. If the charge or debit is to occur manually, then check writing and check payment operations can occur at steps 205, 2205. Otherwise, if the seller has a card, the seller card number can be written down by the user on the appropriate form at step 209. Alternatively, if no card number exists, seller information is written on the form instead at step 208. If a buyer card exists, then the buyer card number is written onto the appropriate form at step 210. Otherwise, buyer information is written manually instead on the form at step 211.

Referring now to FIG. 3, a continuation 300 of the operations of the deposit transaction system, as shown in FIG. 2, are illustrated. Automatic operation is shown beginning at entry point 300 ("A") while manual operation is shown beginning at entry point 350 ("B").

If printing capabilities are found to exist for the POS 101 or the computer terminal 102 or the touch tone phone 103, then a deposit slip is printed at step 313 (as shown in FIGS. 6–8). The buyer then may sign the deposit slip 312 whereupon it is distributed at the point of sales terminal 314 so both seller and buyer each receive a copy 316, and 318 respectively. The processing center also receives a copy 320. If no printing capability (or capabilities) exists, then the seller may write a deposit slip 319 (as shown in FIGS. 8–12) which the seller then signs at step 322. Distribution of the deposit slips will then proceed as previously described.

Alternatively, at manual entry point 350, once the buyer and seller information has been manually written on the forms, the seller then signs those forms at step 324 and the buyer signature and distribution of the copy also proceeds as previously noted.

The processing copy 320 is then attached to the user's check if a deposit transaction rather than a debit transaction occurs. At step 326, the check is transmitted by appropriate means to the transaction processing system 42 where the check is then processed at step 328.

Figure 4:
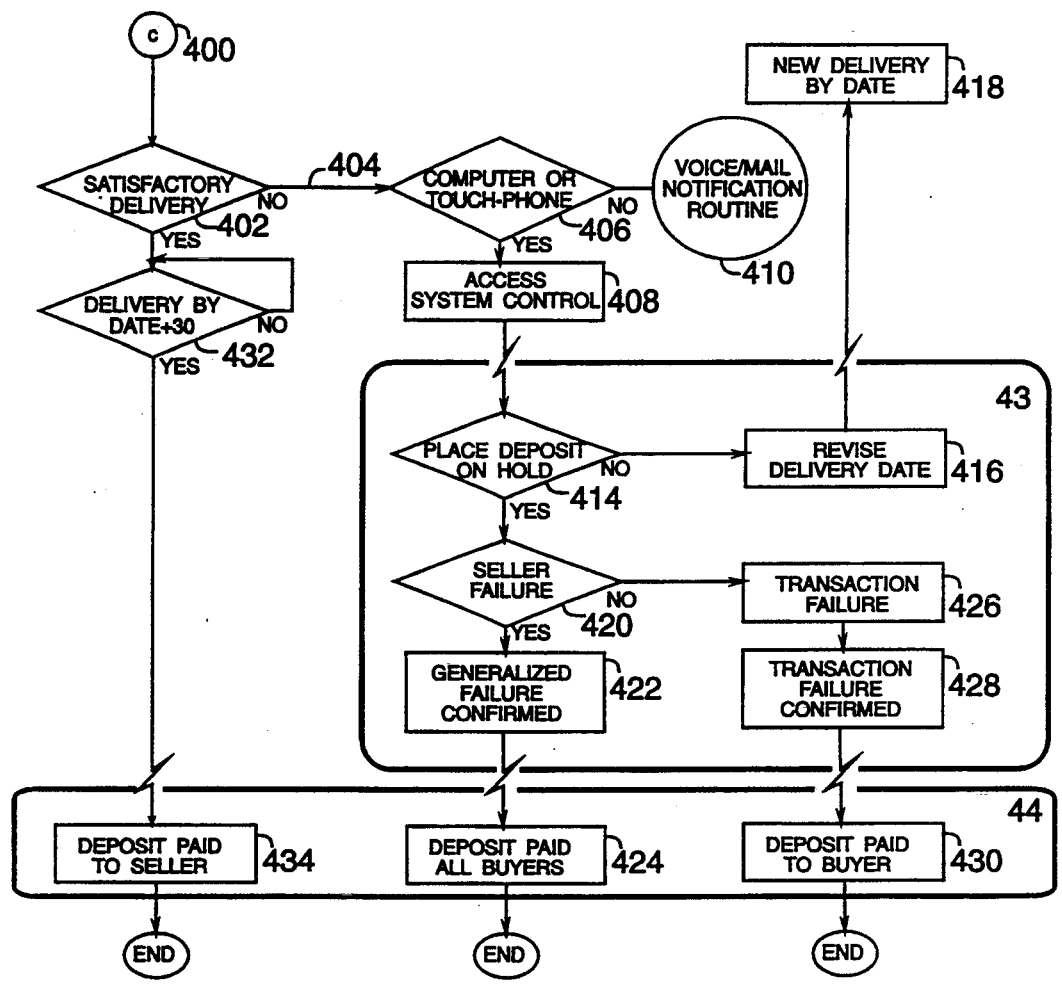
FIG. 4 is a flow chart illustrating the transaction payment process of the transaction protection system shown in FIG. 1B.

Referring now to FIG. 4, a flow chart shows the operation of the system once the pre-condition 203 is set. The implementation of the system, as shown, envisions that the deposit information and control system 43 is engaged by the buyer at step 402 if the buyer feels that satisfactory delivery has not occurred and wishes to place the automatic payment of the deposit to the seller on hold. It is expected that for most deposits, at the delivery-by-date plus a determined number of days 432, the payment system 44 will issue payment of the deposit to the seller 434. From an expense consideration, implementation of the system will avoid the additional step (not illustrated) of requiring the control and the information system 43 to obtain actual delivery confirmation prior to payment of the deposit to the seller. The system does provide a capability for the buyer to advance the payment of the deposit to the seller by accessing the system at 402 and approving payment.

The other processes shown in FIG. 4 involve those situations where there is a generalized failure of the seller (i.e. bankruptcy) or that the transactions-specific condition set at step 203 is not met by the seller, or that the buyer has other reasons to place the payment of the deposit on hold. The operations shown in FIG. 4 can occur either through the computer 102 or touch tone phone 103 which respectively and interactively communicate with the deposit information and control system 43 in the center 40. Use of the information and control system 43 will either result in the effective prevention of payment of the escrowed deposit through the payment system 44, payment of the deposited purchase price, or a variety of other services detailed below.

Placing a payment of the deposit on hold begins at step 402 where the buyer has determined that "satisfactory delivery" has not or is not likely to occur. If the buyer has access to a computer 102 or the touch tone phone 103 at step 406, then the system control is accessed at step 408. Otherwise, voice or mail notification is necessary to place a hold on the deposit account at step 410.

Access to the deposit information and control system 43 is achieved at step 412 through appropriate telecommunications hardware and software 101, 102 or 103. The remaining steps in FIG. 4 (414–434) are described in more detail below after reference to FIG. 5 which describes the actions of the control system.

Figure 5:
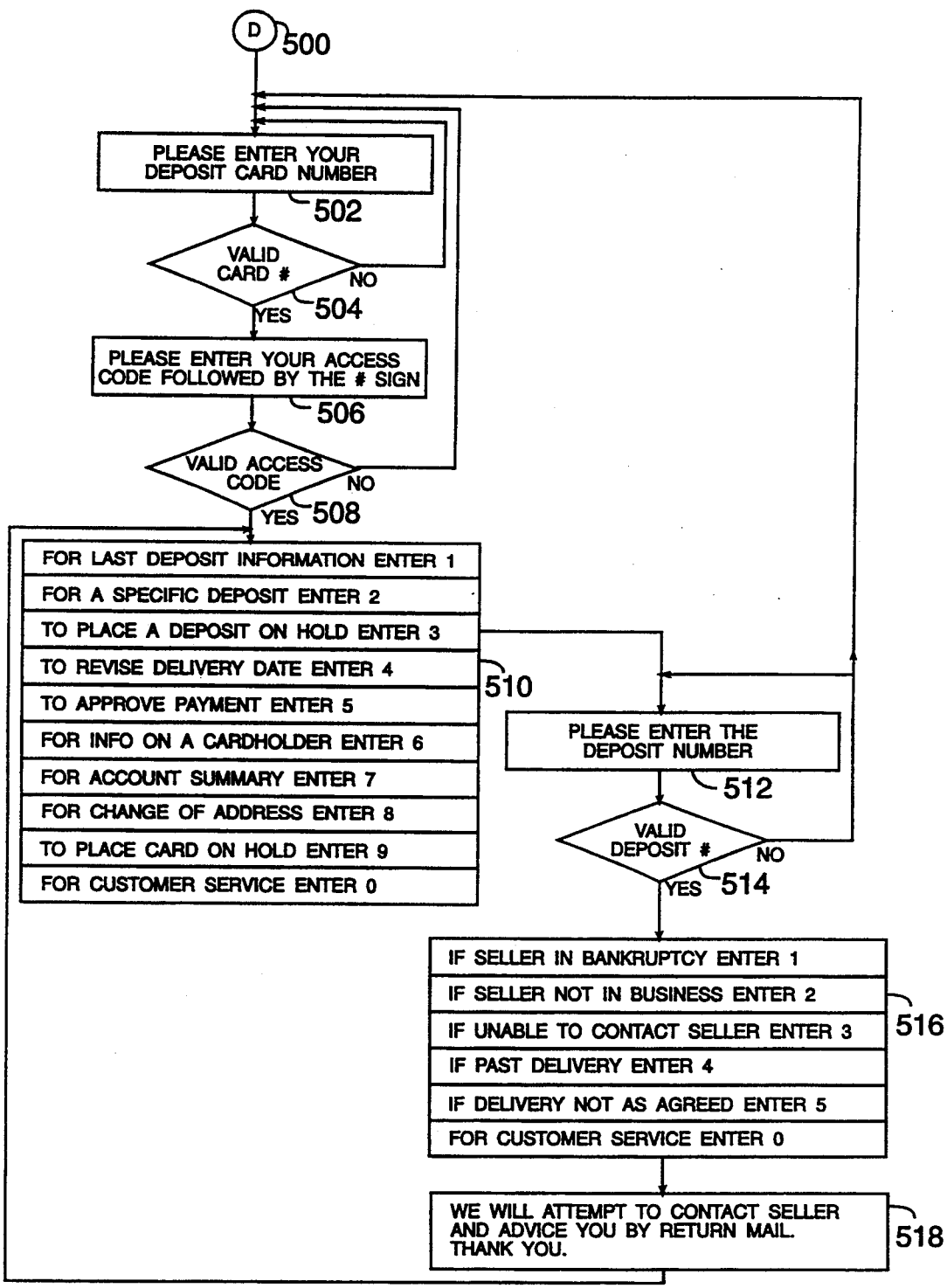
FIG. 5 is a continuation of the detailed flow chart of FIG. 4, illustrating buyer access of the deposit information and control system in order to place a deposit on hold.
Figure 12:

Referring now to FIG. 5, a flow chart shows the deposit and information and control system 43 features which provide both the seller and the buyer respectively with control access to the system. Described below in detail are the steps entered at 500 that would be followed by a buyer in placing the payment of a deposit on hold by means of an interactive touch tone phone 103. These steps would be similar for use with a computer terminal/modem arrangement 102 or any other device with equivalent capabilities. Additionally, the relevant steps would be similar for the seller, with the underlying system software managing access to specific privileges.

If a touch tone phone is used, the user is informed by an appropriate software generated speech to punch his/her key number into the telephone or terminal. If the card number is determined to be valid by query 504, then the buyer is instructed to enter his/her access code at step 506. However, if the card number is invalid, the user is allowed to retry his number for a set number of tries. If the card number is valid, the buyer is instructed to enter his/her access code at step 506. The access code is then tested at step 508, and if approved, the buyer is presented with a menu of options. If the access code is disapproved, however, processing then loops back to the beginning and the buyer must retry both card number and access code again. Finally, if the deposit is made manually, and the buyer does not have a credit card, then both a deposit number and an access number will be sent to the buyer once the system has processed his deposit. The access number may then be used for a subsequent transaction.

Once the access code is approved, a list of ten (10) options are read by (or menu-provided) to the user. Those options include requesting information on last deposit, entering a new deposit, placing a deposit on hold, revising a delivery date, approving a payment, requesting information on specific sellers, requesting account summary information, entering of change of address, placing the user card on hold, or requesting customer service.

FIG. 5 further exemplifies the results of selecting menu item 3 "to place a deposit on hold." Once the menu item 3 option is selected, the user is requested to enter his/her deposit number at step 512. The deposit number is checked for validity. If invalid, the system moves back to the beginning for reentry of the deposit card number and access code. However, if valid, a variety of hold conditions are read (or menu-provided) to the user for selection. Those conditions include if the seller is in bankruptcy, if the seller is no longer in business, if the user is unable to contact the seller, if delivery is past due, if delivery is not as agreed to, or if general customer service is needed.

Other conditions, however, also can be represented by menu 516 and the list presented therein is not exhaustive. If, for example, the user selects item 1 "if seller in bankruptcy", an appropriate message is provided indicating that the system will attempt to contact the seller.

Returning now to FIG. 4, the deposit information and control system 43, as a result of the buyer input described above with regard to FIG. 5, places all the affected seller's deposits on hold 414 since a generalized seller failure may be confirmed. Further, since a seller failure condition, such as bankruptcy, closing, or generalized inability to deliver due to fire, war, etc. may exist 420, the appropriate confirmation procedures are initiated (the series of specific steps over time are indicated only as step 422). Once a generalized seller failure is confirmed, the affected buyers are refunded their deposits (by check, by credit, or by removal of the debit) at step 424. If, however, the buyer response for the reason to place a deposit on hold was not classified as a general seller failure at step 516 (FIG. 5), then a specific transaction failure is indicated, affecting only the specific deposit entered at step 414, and initiating the transaction failure routines at step 426 as well as the transaction failure confirmation procedures 428 (the series of specific steps over time are indicated only as step 428). Upon confirmation, the deposit is refunded to the buyer at step 430.

If confirmation fails, the deposit payment remains on hold until the conflict is resolved by the deposit information and control system 43 (specific steps not shown).

As indicated above, the buyer and/or seller may access the system control 408 for a variety of other reasons. For example, in the instance where the buyer and seller decide upon a new delivery date, then the delivery date is revised at step 416 and the new delivery date is communicated to the buyer and seller at step 418.

As stated at the outset, and as described above, the Transaction Protection System provides an impartial (by means of a non-related third party having no preferential preestablished relationship), readily accessible (by means of a variety of site independent electronic apparatus and manual methods, easily implemented (by means of the full integration to the established credit card systems and simple deposit slip formats), inexpensive (as a result of the accessibility and automation) and standardized service that uniformly and universally (the system focuses on the universally simple concept of the deposit and not the variety of often complex transactions that generate it) protects (by means of a secured thirty party escrow) and encompasses any monies that are tendered by an individual or business entity (any buyer) to a second individual or business entity (any seller) contingent upon the acceptance of goods, services, and or performance (any item regardless of when actual delivery occurs) by either party to the other (recognizing that each entity may be both a buyer and a seller and are to the system "customers"). Further, the system provides the buyer and the seller with appropriate equitable electronic access to and control of the completion of the transaction (by means of the variety of access apparatus, utilities, and system controls.

FIGS. 6–12 illustrate deposit slips 611–621 that are used with the various implementations of the present invention described previously. While some of, the slips illustrated, and other possible variations, are similar to some credit/debit vouchers, the deposit slips uniformly incorporate the following inventive characteristics that distinguish them from the existing art: First, the slips are clearly identified as being deposits signalling the underlying nature of the transaction; second, each deposit slip requires the entry of a delivery-by-date, this being an integral element in the processing of the deposit; third, the deposit slip provides for payment by check, since a significant number of transactions will exceed any reasonable preestablished credit line.

Specifically, FIG. 6 illustrates deposit slip 611. This deposit slip requires that both the seller and buyer have previously assigned cards 30 and that each party has electronic access 101, 102, 103 to the deposit protection card, limit verification system 41, and integrated machine printing capabilities (step 310, FIG. 3). This version of a fully computer-based deposit slip utilizes a multi-part continuous register tape.

With regard to FIG. 7, a deposit charge slip 612 is shown similar to the function to that shown in FIG. 6 but the printing is performed in a non-continuous multi-part form.

In FIG. 8, the deposit slip 613 illustrates an example of a deposit from where the seller has non-computer-based printing capabilities, but has a seller I.D. number. The deposit slips 614 and 619 (FIGS. 9 and 10, respectively) illustrate other versions of deposit slips. Specifically, slip 614 includes a system where both seller and buyer have card numbers but no integrated computer-based printing capability. Deposit slip 619 indicates that either buyer or seller, or both, may neither have assigned card numbers nor have automatic access to the card verification system. The slip 619 is completed by hand.

The deposit slip 620 (FIG. 11) illustrates the linkage of the transaction to another party charge/debit system. This feature may be incorporated into the previously illustrated slips. The deposit slip 621 (FIG. 12) illustrates a deposit form which is less reliant on the hardware systems and requires manual confirmation of delivery prior to payment of the deposit.

While the presently preferred form of the present invention has been set forth in summary form here and above, it is to be understood that the invention is not limited thereby. In particular, the steps of the inventive process are interchangeable and are also considered examples of one of many possible implementations and applications of the inventive concepts. It is also understood that the specific detail shown are merely illustrative and that the invention may be carried out in other ways without departing from the true spirit and scope.

What is claimed is:

1. A computerized transaction protection system for completing a transaction comprising:
   information means for providing information with respect to said transaction, said transaction comprising a buyer, a seller, a deposit amount for a purchase in said transaction and a delivery date for said purchase that is beyond the date of said transaction, said information means comprising a buyer's deposit card and a deposit slip;
   depositing means for enabling said buyer to deposit said deposit amount with a third party prior to said delivery date, said depositing means comprising a use of said deposit card in a credit authorization system;
   escrowing means, operated by said third party, for automatically escrowing said deposit amount;
   input means for inputting said information with respect to said transaction into said escrowing means;
   payment means, electronically connected to said escrowing means, for automatically paying said deposit amount to said seller on a payment date, said payment date being equal to or in the future of said delivery date; and
   accessing means for permitting said buyer to access said escrowing means for controlling said automatic payment of said deposit amount to said seller.

2. The transaction system of claim 1, wherein said input means and accessing means comprises an automated response means for providing instructions.

3. The transaction system of claim 1, wherein said accessing means comprises approving means for said buyer to approve the automatic payment of said deposit amount to said seller.

4. The transaction system of claim 1, wherein said accessing means comprises:
   holding means for said buyer to place on hold the automatic payment of said deposit amount to said seller;
   approving means for said buyer to approve a payment of said deposit amount to said seller; and
   modifying means for said buyer to modify said delivery date.

5. A computerized transaction protection system for completing a transaction comprising:
   information means for providing information with respect to said transaction, said transaction comprising a buyer, a seller, a deposit amount for a purchase in said transaction and a delivery date for said purchase that is beyond the date of said transaction;
   depositing means for enabling said buyer to deposit said deposit amount with a third party prior to said delivery date, said depositing means comprising a check for said deposit amount issued to said third party;
   escrowing means, operated by said third party, for automatically escrowing said deposit amount;
   input means for inputting said information with respect to said transaction into said escrowing means;
   payment means, electronically connected to said escrowing means, for automatically paying said deposit amount to said seller on a payment date, said payment date being equal to or in the future of said delivery date; and
   accessing means for permitting said buyer to access said escrowing means for controlling said automatic payment of said deposit amount to said seller.

6. The transaction system of claim 5, wherein said input means and accessing means comprises an automated response means for providing instructions.

7. The transaction system of claim 5, wherein said accessing means comprises approving means for said buyer to approve the automatic payment of said deposit amount to said seller.

8. The transaction system of claim 5, wherein said accessing means comprises:
   holding means for said buyer to place on hold the automatic payment of said deposit amount to said seller;
   approving means for said buyer to approve a payment of said deposit amount to said seller; and
   modifying means for said buyer to modify said delivery date.

9. The transaction system of claim 5, wherein said information means comprises a deposit slip.

* * * * *